United States Patent
Wang et al.

(10) Patent No.: US 12,160,922 B2
(45) Date of Patent: Dec. 3, 2024

(54) INTERSECTING PROCEDURE PROCESSING METHOD AND DEVICE, APPARATUS, AND STORAGE MEDIUM

(71) Applicant: ZTE CORPORATION, Guangdong (CN)

(72) Inventors: Juntao Wang, Guangdong (CN); Gaopeng Du, Guangdong (CN); Min Yang, Guangdong (CN); Pengzhou Yan, Guangdong (CN); Yi Yang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 332 days.

(21) Appl. No.: 17/773,695

(22) PCT Filed: Oct. 22, 2020

(86) PCT No.: PCT/CN2020/122931
§ 371 (c)(1),
(2) Date: May 2, 2022

(87) PCT Pub. No.: WO2021/088655
PCT Pub. Date: May 14, 2021

(65) Prior Publication Data
US 2022/0386406 A1  Dec. 1, 2022

(30) Foreign Application Priority Data
Nov. 4, 2019  (CN) .......................... 201911067878.6

(51) Int. Cl.
*H04W 76/27* (2018.01)
*H04W 36/00* (2009.01)
*H04W 76/15* (2018.01)

(52) U.S. Cl.
CPC ..... *H04W 76/27* (2018.02); *H04W 36/00698* (2023.05); *H04W 36/0083* (2013.01); *H04W 76/15* (2018.02)

(58) Field of Classification Search
CPC . H04W 76/27; H04W 36/0083; H04W 76/15; H04W 36/00698; H04W 36/0094; H04W 36/08; H04W 36/24; H04W 84/047
See application file for complete search history.

(56) References Cited

U.S. PATENT DOCUMENTS 6,286,104 B1 * 9/2001 Buhle .................. H04L 63/105
707/999.009
9,872,214 B2 * 1/2018 Bao ....................... H04W 36/24
(Continued)

FOREIGN PATENT DOCUMENTS

| CN | 104509161 A | 4/2015 |
| CN | 109547176 A | 3/2019 |

(Continued)

OTHER PUBLICATIONS

European Patent Office, the extended European Search Report dated Oct. 16, 2023, for corresponding EP application No. 20885929.8.
(Continued)

*Primary Examiner* — Brian T O Connor
(74) *Attorney, Agent, or Firm* — Li & Cai Intellectual Property (USA) Office

(57) ABSTRACT

The present application provides an intersecting procedure processing method, an intersecting procedure processing device, an apparatus and a storage medium. The method, applied to a master node, includes: receiving a secondary node procedure message sent by a secondary node; and determining a service processing procedure according to a scenario of a master node service, a scenario of the secondary node procedure and a preset priority of service scenarios,
(Continued)

a handover scenario of the secondary node procedure is determined by the secondary node procedure message.

10 Claims, 7 Drawing Sheets

(56) References Cited

U.S. PATENT DOCUMENTS

| | | | | |
|---|---|---|---|---|
| 10,334,486 | B2* | 6/2019 | Chai | H04W 36/0069 |
| 10,455,459 | B2* | 10/2019 | Hahn | H04W 76/16 |
| 10,743,213 | B2* | 8/2020 | Peng | H04L 5/00 |
| 10,993,153 | B2* | 4/2021 | Teyeb | H04W 36/0088 |
| 11,102,687 | B2* | 8/2021 | Kim | H04W 72/12 |
| 11,516,715 | B2* | 11/2022 | Matsuda | H04W 36/08 |
| 2019/0274075 | A1 | 9/2019 | Chai et al. | |
| 2020/0008100 | A1 | 1/2020 | Peng et al. | |
| 2020/0128454 | A1* | 4/2020 | Teyeb | H04W 36/0088 |

FOREIGN PATENT DOCUMENTS

| | | |
|---|---|---|
| CN | 109548095 A | 3/2019 |
| CN | 111093234 A | 5/2020 |
| WO | WO 2019194729 A1 | 10/2019 |

OTHER PUBLICATIONS

3rd Generation Partnership Project; "Technical Specification Group Radio Access Network; Evolved Universal Terrestrial Radio Access Network", 3GPP Draft; Oct. 2, 2019.

ZTE:"TP 36.423 for MN/SN Interaction in case of Race Condition", 3GPP Draft; R3-17435-TP 36.423 for MNSN Interaction in case of Race Condition, 3rd Generation Relationship PROJECT(3GPP), Mobile Competence Center; 650, dated Nov. 17, 2017.

WIPO, International Search Report issued on Jan. 4, 2021.

* cited by examiner

INTERSECTING PROCEDURE PROCESSING METHOD AND DEVICE, APPARATUS, AND STORAGE MEDIUM

The present application claims priority to the Chinese Patent Application No. 201911067878.6 filed with the Chinese Patent Office on Nov. 4, 2019, the entire contents of which are incorporated herein by reference.

TECHNICAL FIELD

The present disclosure relates to wireless communication networks, and in particular, to an intersecting procedure processing method, an intersecting procedure processing device, an apparatus, and a storage medium.

BACKGROUND

Multi-radio dual connectivity (MR-DC) networking is introduced in R15. By utilizing macro/micro networking to improve spectrum efficiency and load balancing, user equipment (UE) that support dual connectivity may connect simultaneously to a long term evolution (LTE) base station and a new radio (NR) base station, so as to increase throughput of a single user. In a process of a dual connectivity service, when a master node (MN) for the user equipment sends a radio resource control (RRC) connection reconfiguration message, a secondary node (SN) sends a secondary node procedure message, so that an air interface reconfiguration of the master node for the user equipment and an air interface reconfiguration of the secondary node for the user equipment occur simultaneously, and thus signaling procedures with an intersection occur, and a continuity of a service mobility process of the secondary node cannot be guaranteed.

SUMMARY

The present application provides an intersecting procedure processing method, an intersecting procedure processing device, an apparatus, and a storage medium, which can improve a continuity of a service mobility process and reduce service dropped calls.

The present application provides an intersecting procedure processing method, applied to a master node, including:
  receiving a secondary node procedure message sent by a secondary node; the secondary node procedure message includes a secondary node modification message and a secondary node change message, the secondary node modification message carries indication information, the indication information is used to indicate whether the secondary node executes a handover procedure.

The present application provides an intersecting procedure processing method, applied to a secondary node, including:
  generating a secondary node procedure message; the secondary node procedure message includes a secondary node modification message and a secondary node change message, the secondary node modification message carries indication information, the indication information is used to indicate whether the secondary node executes a handover procedure; and sending the secondary node procedure message to a master node.

The present application provides an intersecting procedure processing device, configured in a master node, including:
  a receiving module configured to receive a secondary node procedure message sent by a secondary node; the secondary node procedure message includes a secondary node modification message and a secondary node change message, the secondary node modification message carries indication information, the indication information is used to indicate whether the secondary node executes a handover procedure.

The present application provides an intersecting procedure processing device, configured in a secondary node, including:
  a generating module configured to generate a secondary node procedure message; the secondary node procedure message includes a secondary node modification message and a secondary node change message, the secondary node modification message carries indication information, the indication information is used to indicate whether the secondary node executes a handover procedure; and a sending module configured to send the secondary node procedure message to a master node.

The present application provides a base station, including:
  one or more processors; and
  a storage device configured to store one or more programs;
  the one or more programs, when executed by the one or more processors, cause the one or more processors to implement the intersecting procedure processing method described above.

The present application provides a storage medium having a computer program stored therein, the computer program, when executed by a processor, implements the intersecting procedure processing method described above.

With regard to the above and other aspects of the present application and implementations thereof, further explanation is provided in the brief description of drawings, the detailed description of embodiments and the claims.

DETAIL DESCRIPTION OF EMBODIMENTS

The embodiments of the present application are described below with reference to the accompanying drawings. It should be noted that the embodiments of the present application and characteristics in the embodiments may be combined with each other if no conflict is incurred.

Operations shown in the flowchart of the accompanying drawings may be executed in a computer system such as a set of computer-executable instructions. Moreover, although a logical sequence is shown in the flowchart, in some cases, the operations illustrated or described herein may be performed in an order different from that described here.

Under a dual connectivity architecture, user equipment (UE) may maintain a connection with two base stations simultaneously, one of the two base stations is referred to as a master node (MN) and the other base station is referred to as a secondary node (SN).

The UE is a device with wireless transceiving function, may be deployed on land including indoor or outdoor, may be handheld, wearable, or vehicle-mounted; may also be deployed on water surface (e.g., on a ship and the like); may also be deployed in air (e.g., in airplanes, balloons, satellites, and the like). The UE may be a mobile phone, a tablet PC (e.g., Pad), a computer with wireless transceiving function, a virtual reality (VR) terminal, an augmented reality (AR) terminal, a wireless terminal in industrial control, a wireless terminal in self-driving, a wireless terminal in remote medical, a wireless terminal in smart grid, a wireless terminal in transportation safety, a wireless terminal in smart city, a wireless terminal in smart home and the like. The embodiments of the present application do not limit application scenarios. The UE may also be referred to as a terminal, an access terminal, an UE unit, an UE station, a mobile base station, a mobile station, a remote station, a remote terminal, a mobile device, an UE terminal, a wireless communication device, an UE agent, an UE device, or the like. In the embodiments of the present application, a 5G terminal is illustrated as an example.

Under the dual connectivity architecture, expectations for a bearer are as follows: for a master cell group (MCG) bearer and a secondary cell group (SCG) bearer, the SCG bearer use a new radio (NR) packet data convergence protocol (PDCP), for the MCG bearer, a long term evolution (LTE) PDCP or the NR PDCP may be used; for the MCG bearer, the NR PDCP configuration is generated by the MN in the dual connectivity, and for the SCG bearer, the NR PDCP configuration is generated by the SN in the dual connectivity.

In a dual connectivity service process, an air interface reconfiguration of the UE by the MN and an air interface reconfiguration of the UE by the SN occur simultaneously, and thus signaling procedures with an intersection occur. In addition, a same problem exists in a case where a network or the user equipment does not support signaling radio bearers (SRBs).

Figure 1:
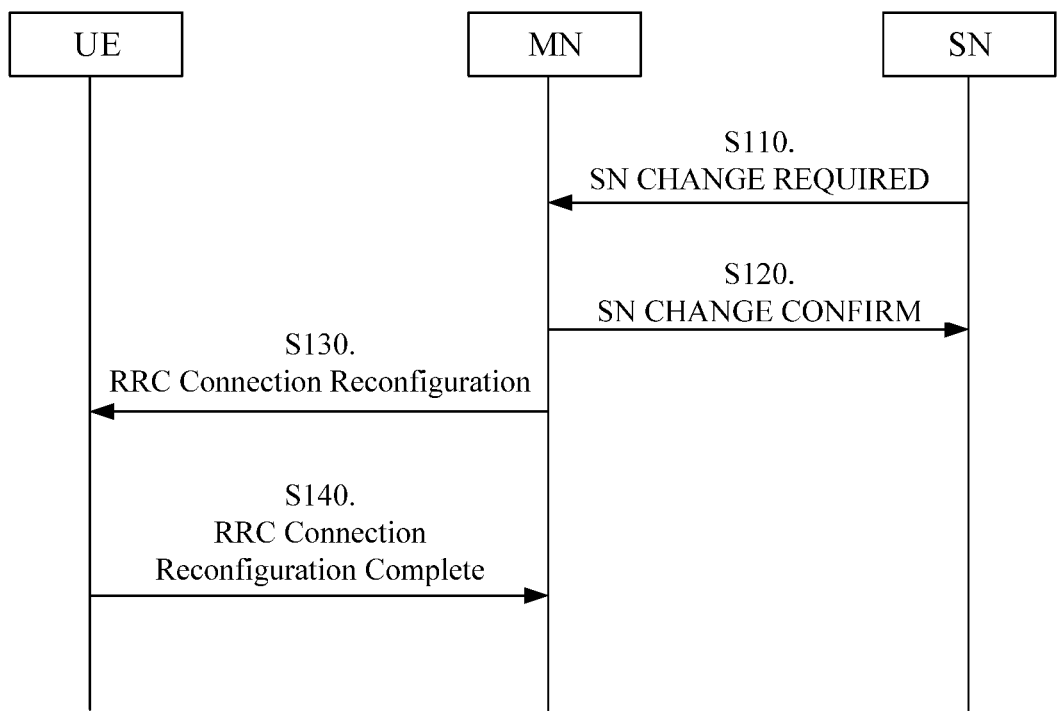
FIG. 1 is a schematic diagram of a procedure, relating to a master node, initiated by a secondary node according to the present application.

A current standard protocol defines that when the MN initiates a handover procedure, the MN can directly reject a SN modification message initiated by the SN when receiving the SN modification message. FIG. 1 is a schematic diagram of a procedure, relating to a MN, initiated by a SN according to the present application, and as shown in FIG. 1, the procedure, relating to the MN, initiated by the SN includes operations S110, S120, S130 and S140.

At operation S110, the SN sends a SN change message ("SN CHANGE REQUIRED") to the MN.

At operation S120, the MN feeds back a SN change confirmation message ("SN CHANGE CONFIRM") to the SN.

At operation S130, the MN sends a radio resource control (RRC) connection reconfiguration message ("RRC Connection Reconfiguration") to the UE.

At operation S140, the UE feeds back a RRC connection reconfiguration completion message ("RRC Connection Reconfiguration Complete") to the MN.

The procedure, relating to the MN, initiated by the SN further includes a SN change procedure, a SN key update procedure, and the like.

Figure 2:
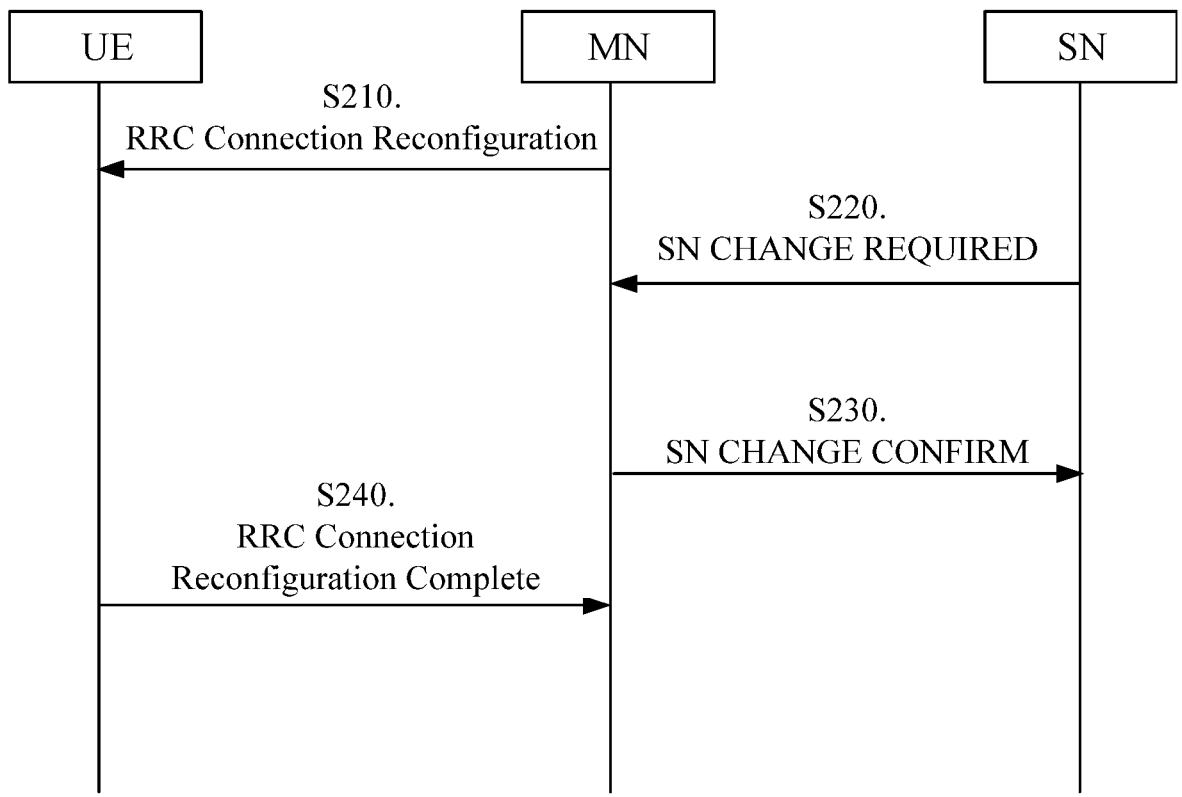
FIG. 2 is a schematic diagram of a procedure, relating to a master node, initiated by a secondary node according to the present application.

FIG. 2 is a schematic diagram of a procedure, relating to a MN, initiated by a SN according to the present application, and as shown in FIG. 2, the procedure, relating to the MN, initiated by the SN includes operations S210, S220, S230 and S240.

At operation S210, the MN sends the RRC connection reconfiguration message ("RRC Connection Reconfiguration") to the UE.

At operation S220, the SN sends the SN change message ("SN CHANGE REQUIRED") to the MN.

At operation S230, the MN feeds back the SN change confirmation message ("SN CHANGE CONFIRM") to the SN.

At operation S240, the UE feeds back the RRC connection reconfiguration completion message ("RRC Connection Reconfiguration Complete") to the MN.

The SN initiates a procedure not relating to the MN, such as a primary SCG cell change (PSCell Change) and a measurement configuration in a Without SRB3 scenario. Air interface reconfiguration information of the SN not relating to the MN is to be transferred to the UE through the MN, and meanwhile, information reported by the UE is also to be transferred to the SN through the MN.

Figure 3:
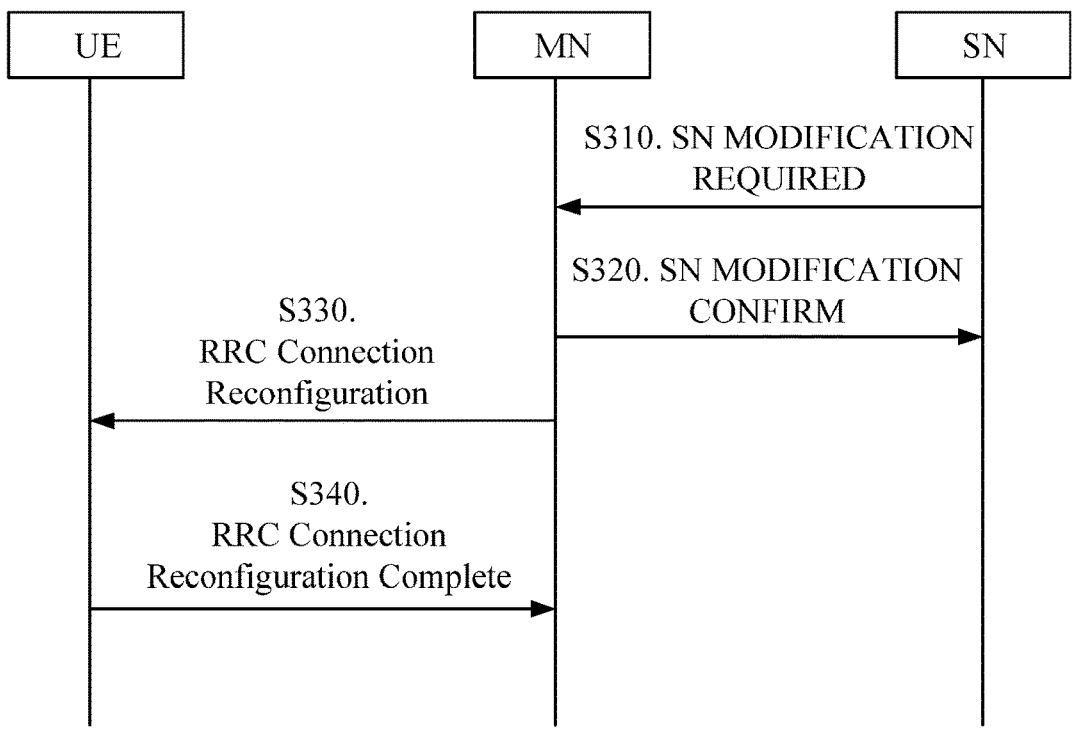
FIG. 3 is a schematic diagram of a procedure, not relating to a master node, initiated by a secondary node according to the present application.

FIG. 3 is a schematic diagram of a procedure, not relating to a MN, initiated by a SN according to the present application, and as shown in FIG. 3, the procedure, not relating to the MN, initiated by the SN includes S310, S320, S330 and S340.

At operation S310, the SN sends a SN modification message ("SN MODIFICATION REQUIRED") to the MN.

At operation S320, the MN feeds back a SN modification confirmation message ("SN MODIFICATION CONFIRM") to the SN.

At operation S330, the MN sends the RRC connection reconfiguration message ("RRC Connection Reconfiguration") to the UE.

At operation S340, the UE feeds back the RRC connection reconfiguration completion message ("RRC Connection Reconfiguration Complete") to the MN.

Figure 4:
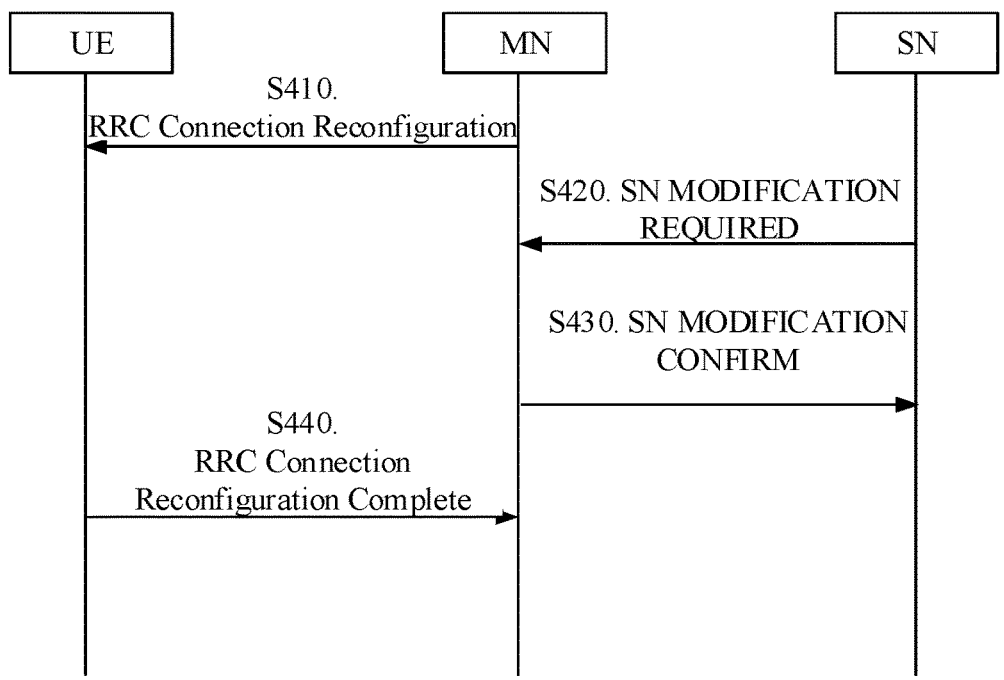
FIG. 4 is a schematic diagram of a procedure, not relating to a master node, initiated by a secondary node according to the present application.

FIG. 4 is a schematic diagram of a procedure, not relating to a MN, initiated by a SN according to the present application, and as shown in FIG. 4, the procedure, not relating to the MN, initiated by the SN includes S410, S420, S430 and S440.

At operation S410, the MN sends the RRC connection reconfiguration message ("RRC Connection Reconfiguration") to the UE.

At operation S420, the SN sends the SN modification message ("SN MODIFICATION REQUIRED") to the MN.

At operation S430, the MN feeds back the SN modification confirmation message ("SN MODIFICATION CONFIRM") to the SN.

At operation S440, the UE feeds back the RRC connection reconfiguration completion message ("RRC Connection Reconfiguration Complete") to the MN.

In the dual connectivity service process, the MN and the SN are intersect in signaling procedure, and there is no effective solution therefor. The present application provides a method for solving procedure conflicts in a MN non-mobile scene and a SN mobile/non-mobile scene in the dual connectivity service process, so as to optimize conflict procedures.

Figure 5:
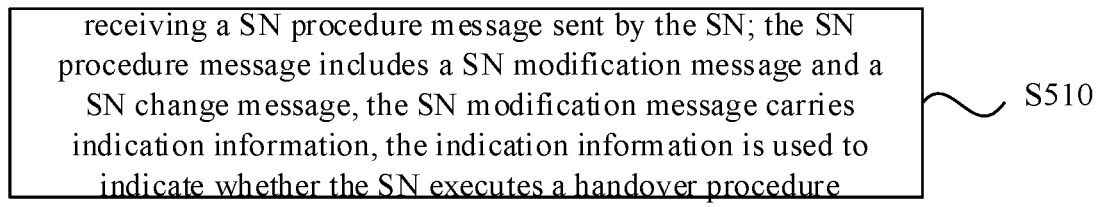
FIG. 5 is a schematic flowchart of an intersecting procedure processing method according to the present application.

In some implementations, FIG. 5 is a schematic flowchart of an intersecting procedure processing method according to the present application. The method may be suitable for a case in which signaling procedures intersect in the dual connectivity architecture. The method may be performed by the intersecting procedure processing device according to the present application, and the intersecting procedure processing device may be implemented by software and/or hardware and may be integrated on a base station used as the MN.

As shown in FIG. 5, the intersecting procedure processing method includes operations S510.

At operation S510, receiving a SN procedure message sent by the SN; the SN procedure message includes a SN modification message ("SN MODIFICATION REQUIRED") and a SN change message ("SN CHANGE REQUIRED"), the SN modification message carries indication information, the indication information is used to indicate whether the SN executes a handover procedure.

In the present application, the SN procedure message corresponds to a message in TS36.423 and TS38.423 of the 3rd Generation Partnership Project (3GPP).

For example, the SN includes a secondary evolved NodeB (SENB), a secondary Node (S-NODE) and a secondary next generation NodeB (SGNB). The SN procedure message includes "SENB MODIFICATION REQUIRED", "SENB MODIFICATION REQUEST ACKNOWLEDGE", "S-NODE MODIFICATION REQUIRED", "S-NODE MODIFICATION REQUEST ACKNOWLEDGE", "S-NODE CHANGE REQUIRED", "SGNB MODIFICATION REQUIRED", "SGNB MODIFICATION REQUEST ACKNOWLEDGE", and "SGNB CHANGE REQUIRED".

The handover procedure corresponding to the present application refers to a handover procedure caused by mobility of the UE, such as a PSCell Change procedure, a SN change procedure, and the like.

The intersecting procedure processing method further includes: determining a service processing procedure according to a type of a MN procedure, a type of a SN procedure and a preset procedure priority, the type of the SN procedure is determined by the SN procedure message.

In service scenarios in which at least two procedures of followings are executed, a priority of execution of the procedures from high to low is as follows: a MN handover procedure, a SN handover procedure, a MN non-handover procedure, and a SN non-handover procedure.

In the present application, the type of the MN procedure includes the MN handover procedure and the MN non-handover procedure; the type of the SN procedure includes the SN handover procedure, and the SN non-handover procedure.

Handover reconfiguration of the MN is to ensure service continuity and reduce service dropped calls. Non-handover reconfiguration of the MN is used for enhancing service configuration and belongs to service optimization. In a case where a MN non-handover reconfiguration procedure triggered by the MN and a SN handover reconfiguration procedure triggered by the SN simultaneously occur in a short time, the MN is to ensure service reliability and continuity preferentially, and then consider service enhancement.

From a perspective of user experiences, a priority of the MN handover procedure is higher than a priority of the MN non-handover procedure, and a priority of the SN handover procedure is higher than the priority of the MN non-handover procedure. Therefore, the priority of execution of the procedures from high to low is as follows: the MN handover procedure, the SN handover procedure, the MN non-handover procedure, and the SN non-handover procedure. The non-handover reconfiguration triggered by the MN may include a carrier aggregation (CA) reconfiguration, a measurement-aided reconfiguration, and other scenarios of a service enhancement configuration.

In the dual connectivity service process, the MN non-handover procedure and the SN handover procedure occur simultaneously, in a case where the procedures conflict, the MN can proceed according to a strategy that a priority of a handover procedure is higher than a priority of a non-handover procedure, and meanwhile, the SN indicates a handover procedure inside the SN to the MN through indication information, so as to provide priority reference for the MN. A handover procedure initiated by the SN includes, but not limited to, an SN modification procedure and an SN change procedure, and also includes an SN modification procedure triggered in the Without SRB3 scenario. The MN preferentially processes the MN handover procedure, then processes the SN handover procedure (such as the PSCell Change procedure), and finally processes other non-handover procedures. Therefore, the continuity of mobility in the dual connectivity service process is guaranteed and the service dropped calls are reduced. Meanwhile, in some scenarios, a second configuration of an air interface can be reduced and user experiences in the dual connectivity service process are improved.

Figure 6:
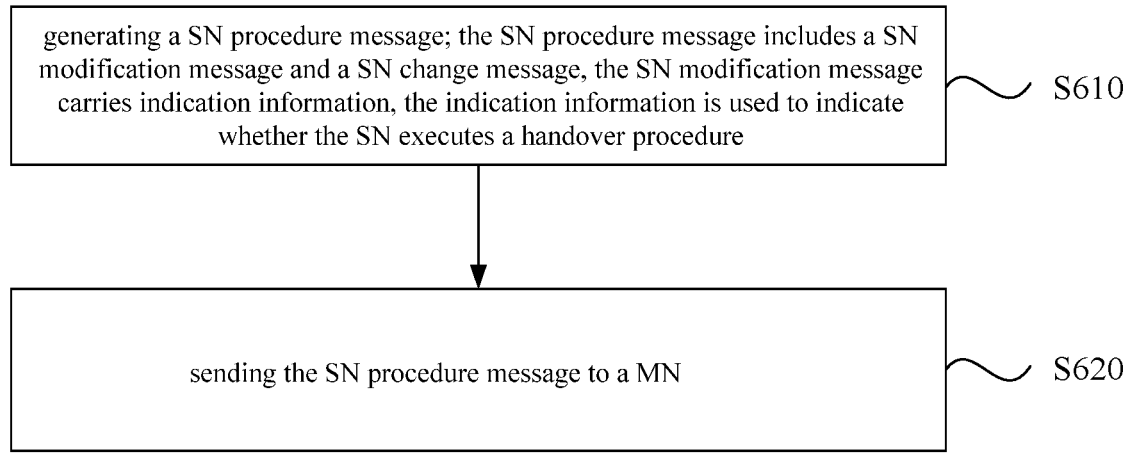
FIG. 6 is a schematic flowchart of an intersecting procedure processing method according to the present application.

In some implementations, FIG. 6 is a schematic flowchart of an intersecting procedure processing method according to the present application. The method may be suitable for a case in which signaling procedures intersect in the dual connectivity architecture. The method may be performed by the intersecting procedure processing device according to the present application, and the intersecting procedure processing device may be implemented by software and/or hardware and may be integrated on a base station used as the SN.

As shown in FIG. 6, the intersecting procedure processing method includes operations S610 and S620.

At operation S610, generating a SN procedure message; the SN procedure message includes a SN modification message and a SN change message, the SN modification message carries indication information, the indication information is used to indicate whether the SN executes a handover procedure.

At operation S620, sending the SN procedure message to a MN.

In the present application, the SN procedure message includes the SN modification message and the SN change message, and the SN modification message includes a SN modification message carrying indication information and a SN modification message not carrying indication information.

The SN handover procedure includes, but is not limited to, a SN modification procedure and a SN change procedure.

The indication information may be in a mode of carrying an indication cell, and may also be in other indication modes.

In some implementations, in a case where an internal handover procedure occurs in the SN, the indication cell is carried in the SN modification message, and in a case where no internal handover procedure occurs in the SN, no indication cell is carried in the SN modification message.

In some implementations, in a case where an internal handover procedure occurs in the SN, the indication information is "1". The indication information being "1" is used for indicating the MN that the internal handover procedure occurs in the SN. In a case where no internal handover procedure occurs in the SN, no indication cell is carried in the modification message, the indication information is "0". The indication information being "0" is used for indicating the MN that no internal handover procedure occurs in the SN.

It should be noted that the indication information being "1" or "0" is only exemplary, rather than limiting. Other symbols may be selected as the indication information according to actual conditions, for example, the indication information may be "ON" for indicating the MN that the internal handover procedure occurs in the SN; the indication information may be "OFF" for indicating the MN that no internal handover procedure occurs in the SN.

The present application achieves priority processing of procedures of the MN and the SN under a condition that the procedures intersect in the dual connectivity process, improves priority of the service mobility from the perspective of user experiences, and ensures the service continuity and lowers the process failure probability and the probability of dropped calls of the SN. Meanwhile, the present application reduces a number of times of air interface reconfigurations in some scenarios, and improves user experiences of the dual connectivity bearer user in a service mobility process.

The present application is suitable for scenarios of the dual connectivity, a CA, and a combination of the dual connectivity and other technologies. The present application is suitable for the dual connectivity technology in LTE, and scenarios of combinations of the dual connectivity and other technologies.

The dual connectivity in the present application includes, but is not limited to, multi-radio dual connectivity (MR-DC) technologies such as a dual connectivity of a 4G evolved-universal terrestrial radio access (E-UTRA) and a 5G NR, i.e., an E-UTRA-NR Dual Connectivity (EN-DC), a dual connectivity of the 5G NR and the E-UTRA, i.e., a NR-E-UTRA Dual Connectivity (NE-DC), a dual connectivity of the E-UTRA and the 5G NR under a Next Generation Radio Access Network (NG-RAN), i.e., a NG-RAN E-UTRA-NR Dual Connectivity (NGEN-DC), and a dual connectivity of the 5G NR and the 5G NR, i.e., a NR-NR Dual Connectivity (NR-DC). The present application is also suitable for other scenarios in which the SN notifies the MN that mobility occurs in the SN. The present application is also applicable to other technical fields of a communication system.

In some implementations, the MN handover procedure and a reconfiguration procedure of the SN modification message carrying the indication information intersect. In a case where the MN executes the MN handover procedure, and the RRC connection reconfiguration message is not sent to the UE, the SN modification message carrying the indication information sent by the SN is received; and a MCG of the MN and a SCG of the SN are encapsulated into a new RRC connection reconfiguration message, and the new RRC connection reconfiguration message is sent to the UE.

Figure 7:
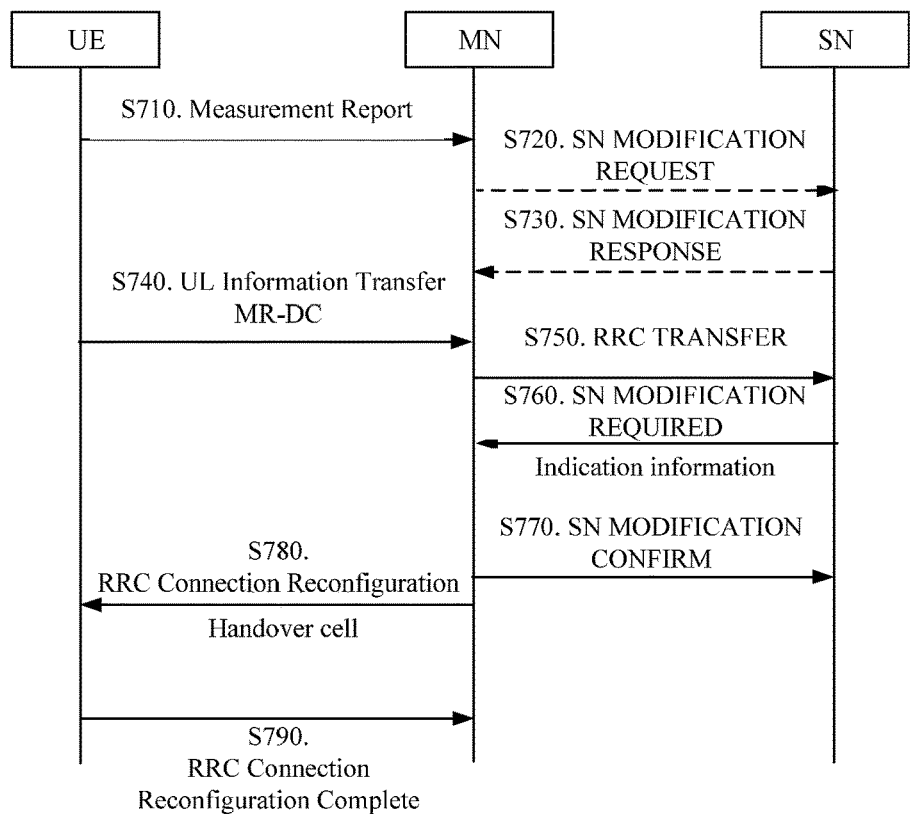
FIG. 7 is a flowchart of a processing method when a master node handover procedure and a secondary node handover procedure intersect according to the present application.

FIG. 7 is a flowchart of a processing method when a MN handover procedure and a SN handover procedure intersect according to the present application. As shown in FIG. 7, when a MN handover procedure and a SN handover procedure intersect, operations S710, S740, S750, S760, S770, S780 and S790 are executed.

At operation S710, the UE sends a measurement result ("Measurement Report") to the MN.

After receiving the measurement result sent by the UE, the MN initiates the MN handover procedure.

At operation S740, the MN receives an uplink (UL) transfer information ("UL Information Transfer MR-DC") of a SN air interface sent by the UE.

At operation S750, the MN sends a RRC transfer information to the SN.

The MN acquires the RRC transfer information according to the UL transfer information of the SN air interface, and sends the RRC transfer information to the SN.

At operation S760, the SN sends a SN modification message to the MN, the SN modification message carries indication information.

At operation S770, the MN sends a SN modification confirmation to the SN.

At operation S780, the MN sends a RRC connection reconfiguration message to the UE, the RRC connection reconfiguration message carries a handover cell.

At operation S790, the UE sends a RRC connection reconfiguration completion message to the MN.

In a case where the MN initiates an initial handover procedure, the RRC connection reconfiguration message is not sent to the UE, the MN receives the SN modification information sent by the SN, and the SN modification information carries indication information, the MN delays sending the RRC connection reconfiguration information and encapsulates a MCG configuration information of the MN and a SCG configuration information of the SN into a new RRC connection reconfiguration information, and sends the new RRC connection reconfiguration information to the UE, so that the second reconfiguration of the air interface is reduced.

At operation S720, the MN sends modification inquiry information to the SN, and at operation S730, the SN sends a modification inquiry result to the MN. The operations S720 and S730 may be executed or may not be executed when the MN handover procedure and the SN handover procedure intersect.

In some implementations, in a case where the MN executes the MN non-handover procedure, and the RRC connection reconfiguration message is not sent to the user equipment, the SN modification message carrying the indication information sent by the SN is received; the SN modification message carrying the indication information, as the RRC connection reconfiguration message of the SN, is sent to the UE; and after receiving a RRC connection reconfiguration completion message sent by the user equipment, the MN non-handover procedure is processed.

Figure 8:
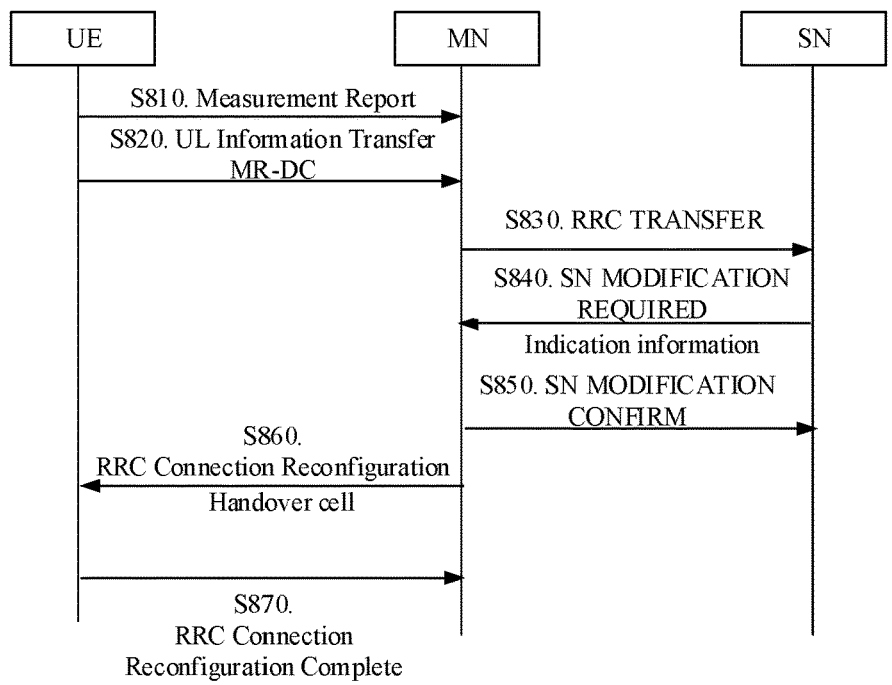
FIG. 8 is a flowchart of a processing method when a master node non-handover procedure and a secondary node handover procedure reconfiguration intersect according to the present application.

FIG. 8 is a flowchart of a processing method when a MN non-handover procedure and a SN handover procedure reconfiguration intersect according to the present application. As shown in FIG. 8, when the MN non-handover procedure and a PSCell Change reconfiguration intersect, operations S810 to S870 are executed.

At operation S810, the UE sends a measurement result ("Measurement Report") to the MN.

After receiving the measurement result sent by the UE, the MN initiates the MN non-handover procedure.

At operation S820, the MN receives an UL transfer information ("UL Information Transfer MR-DC") of the SN air interface sent by the UE.

At operation S830, the MN sends a RRC transfer information to the SN.

The MN acquires the RRC transfer information according to the UL transfer information of the SN air interface, and sends the RRC transfer information to the SN.

At operation S840, the SN sends a SN modification message to the MN, the SN modification message carries the indication information.

At operation S850, the MN sends a SN modification confirmation to the SN.

At operation S860, the MN sends a RRC connection reconfiguration message to the UE, the RRC connection reconfiguration message carries a handover cell.

At operation S870, the UE sends a RRC connection reconfiguration completion message to the MN.

In the present application, the MN initiates a non-handover procedure, in a case where the RRC connection reconfiguration message is not sent to the UE, the MN receives the SN modification message carrying the indication information, and then the MN may preferentially process the SN modification procedure and then process the MN non-handover procedure after the SN modification procedure is completed.

In some implementations, in a case where the MN executes the MN non-handover procedure, the RRC connection reconfiguration message is sent to the user equipment, and the RRC connection reconfiguration completion message fed back by the user equipment is not received, the SN modification message carrying the indication information sent by the SN is received; the SN modification message carrying the indication information is put into a cache queue with a highest priority; and after receiving the RRC connection reconfiguration completion message fed back by the user equipment, the SN modification message carrying the indication information, as the RRC connection reconfiguration message of the SN, is sent to the user equipment.

Figure 9:
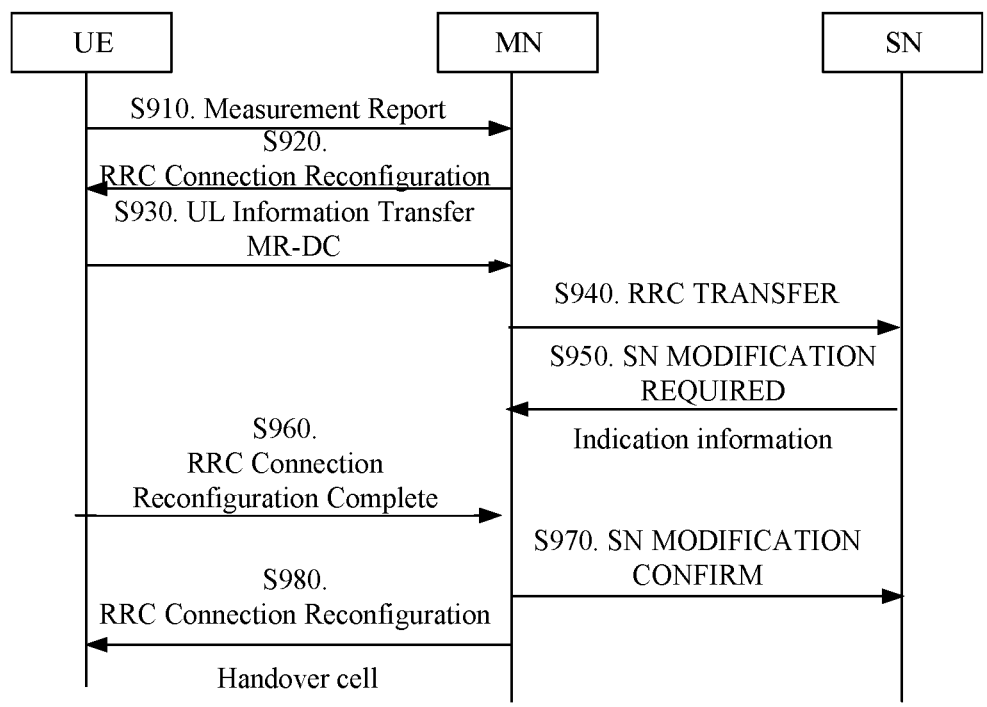
FIG. 9 is a flowchart of a processing method when a master node non-handover procedure and a secondary node handover procedure reconfiguration intersect according to the present application.

FIG. 9 is a flowchart of a processing method when a MN non-handover procedure and a SN handover procedure reconfiguration intersect according to the present application. As shown in FIG. 9, when the MN non-handover procedure and the SN handover procedure reconfiguration intersect, operations S910 to S980 are executed.

At operation S910, the UE sends a measurement result ("Measurement Report") to the MN.

After receiving the measurement result sent by the UE, the MN initiates the MN non-handover procedure.

At operation S920, the MN sends a RRC connection reconfiguration message to the UE.

At operation S930, the MN receives an UL transfer information ("UL Information Transfer MR-DC") of the SN air interface sent by the UE.

At operation S940, the MN sends a RRC transfer information to the SN.

The MN acquires the RRC transfer information according to the UL transfer information of the SN air interface, and sends the RRC transfer information to the SN.

At operation S950, the SN sends a SN modification message to the MN, the SN modification message carries a Pscell Change cell.

At operation S960, the UE sends a RRC connection reconfiguration completion message to the MN.

At operation S970, the MN sends a SN modification confirmation to the SN.

At operation S980, the MN sends a RRC connection reconfiguration message to the UE, the RRC connection reconfiguration message carries a handover cell.

If a common reconfiguration message of a non-mobility scene is sent to the UE from the MN, and the MN receives a SN modification request initiated by the SN before receiving the RRC connection reconfiguration completion message fed back by the UE, the MN puts a SN modification procedure carrying the indication information into a high-priority cache queue, after the MN receives the RRC connection reconfiguration completion message and enters a steady state, the SN modification procedure is processed preferentially to prevent conflicts with other procedures initiated in the MN. Other processes decided by the MN may include scenarios such as balancing, load control, or the like. In some implementations, if the MN identifies the SN handover procedure, the SN handover procedure is processed preferentially to reduce an occurrence of a NR SCG failure.

In some implementations, in a case where the MN executes the MN non-handover procedure, and the RRC connection reconfiguration message is not sent to the user equipment, the SN change message sent by the SN is received; the SN change message, as the RRC connection reconfiguration message of the SN, is sent to the user equipment; and after receiving the RRC connection reconfiguration completion message fed back by the user equipment, the MN non-handover procedure is processed.

Figure 10:
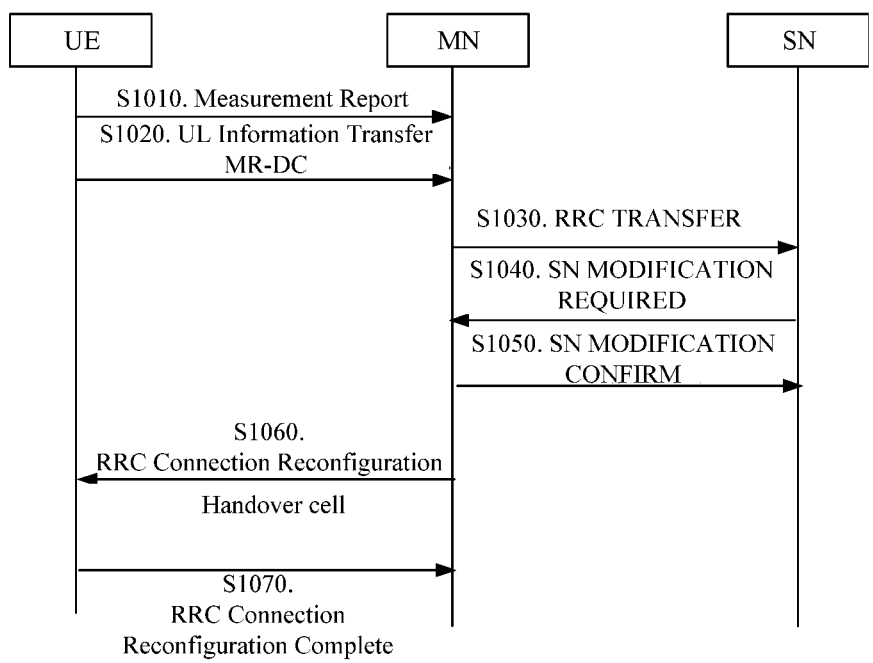
FIG. 10 is a flowchart of a processing method when a master node non-handover procedure and a secondary node handover procedure reconfiguration intersect according to the present application.

FIG. 10 is a flowchart of a processing method when a MN non-handover procedure and a SN handover procedure reconfiguration intersect according to the present application. As shown in FIG. 10, when the MN non-handover procedure and the SN Change reconfiguration intersect, operations S1010 to S1070 are executed.

At operation S1010, the UE sends a measurement result ("Measurement Report") to the MN.

After receiving the measurement result sent by the UE, the MN initiates the MN non-handover procedure.

At operation S1020, the MN receives an UL transfer information ("UL Information Transfer MR-DC") of the SN air interface sent by the UE.

At operation S1030, the MN sends a RRC transfer information to the SN.

The MN acquires the RRC transfer information according to the UL transfer information of the SN air interface, and sends the RRC transfer information to the SN.

At operation S1040, the SN sends a SN change message to the MN.

At operation S1050, the MN sends a SN change confirmation message to the SN.

At operation S1060, the MN sends a RRC connection reconfiguration message to the UE, the RRC connection reconfiguration message carries a handover cell.

At operation S1070, the UE sends a RRC connection reconfiguration completion message to the MN.

If the MN initiates a non-handover procedure, in a case where the RRC connection reconfiguration message is not sent to the UE, in response to that the MN receives the SN Change message, the MN may preferentially process the SN Change procedure and then process the MN non-handover procedure after the SN Change procedure is completed.

In some implementations, in a case where the MN executes the MN non-handover procedure, the RRC connection reconfiguration message is sent to the user equipment, and the RRC connection reconfiguration completion message fed back by the user equipment is not received, the SN change message sent by the SN is received; the SN change message is put into the cache queue with the highest priority; and after receiving the RRC connection reconfiguration completion message fed back by the user equipment, the SN change message, as the RRC connection reconfiguration message of the SN, is sent to the user equipment.

Figure 11:
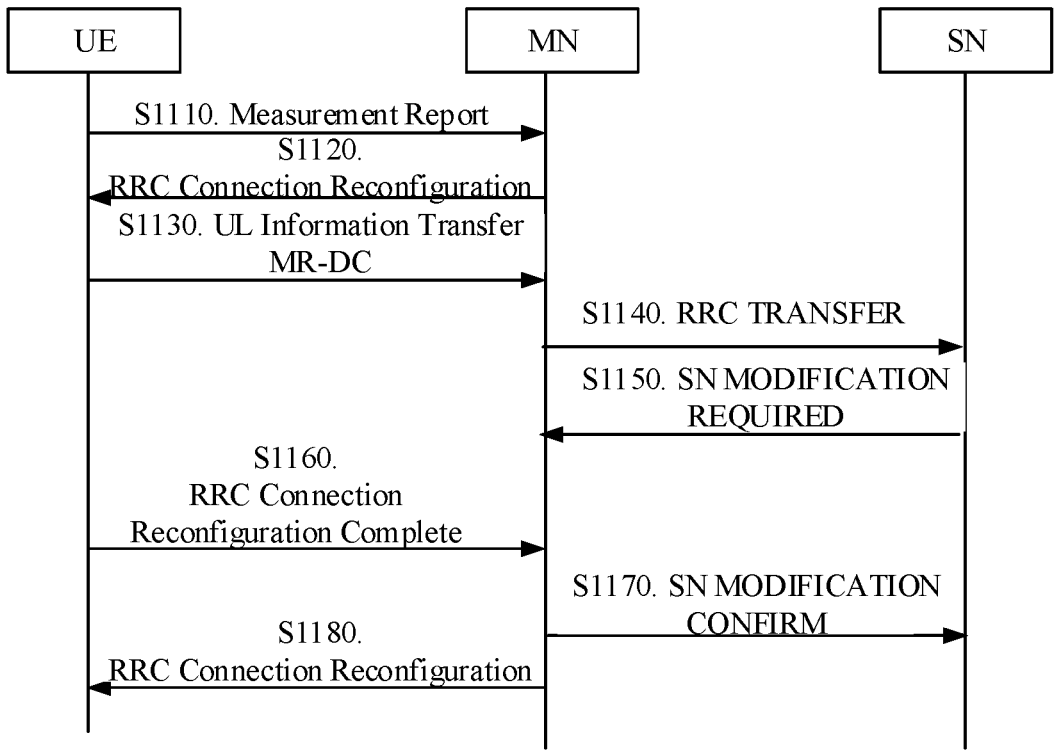
FIG. 11 is a flowchart of a processing method when a master node non-handover procedure and a secondary node handover procedure reconfiguration intersect according to the present application.

FIG. 11 is a flowchart of a processing method when a MN non-handover procedure and a SN handover procedure reconfiguration intersect according to the present application. As shown in FIG. 11, when the MN non-handover procedure and the PSCell Change reconfiguration intersect, operations S1110 to S1180 are executed.

At operation S1110, the UE sends a measurement result ("Measurement Report") to the MN.

After receiving the measurement result sent by the UE, the MN initiates the MN non-handover procedure.

At operation S1120, the MN sends a RRC connection reconfiguration message to the UE.

At operation S1130, the MN receives an UL transfer information ("UL Information Transfer MR-DC") of the SN air interface sent by the UE.

At operation S1140, the MN sends a RRC transfer information to the SN.

The MN acquires the RRC transfer information according to the UL transfer information of the SN air interface, and sends the RRC transfer information to the SN.

At operation S1150, the SN sends a SN change message to the MN.

At operation S1160, the UE sends a RRC connection reconfiguration completion message to the MN.

At operation S1170, the MN send a SN change confirmation message to the SN.

At operation S1180, the MN sends a RRC connection reconfiguration message to the UE, the RRC connection reconfiguration message carries a handover cell.

If the MN initiates a non-handover reconfiguration procedure to the UE, the RRC connection reconfiguration message of the air interface is sent to the UE, and the MN receives the SN Change message before receiving the RRC connection reconfiguration completion message, the MN puts the SN change procedure into a high-priority cache queue, after the MN receives the RRC connection reconfiguration completion message of the air interface and enters a steady state, the SN change procedure is processed preferentially to prevent conflicts with other procedures initiated in the MN. Other processes decided by the MN may include scenarios such as balancing, load control, or the like. In some implementations, if the MN identifies the SN mobility processing procedure, the SN mobility processing procedure is processed preferentially to reduce an occurrence of a NR SCG failure.

Figure 12:
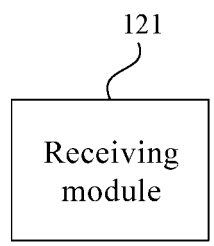
FIG. 12 is a structural schematic diagram of an intersecting procedure processing device according to the present application.

The present application provides an intersecting procedure processing device, FIG. 12 is a structural schematic diagram of an intersecting procedure processing device according to the present application. The device may be suitable for a case that signaling procedures intersect in the dual connectivity architecture. The device may perform the intersecting procedure processing method according to the present application, and the intersecting procedure processing device may be implemented by software and/or hardware and may be integrated on a base station used as the MN.

As shown in FIG. 12, the intersecting procedure processing device according to the present application includes a receiving module 121.

The receiving module 121 is configured to receive a SN procedure message sent by the SN; the SN procedure message includes a SN modification message and a SN change message, the SN modification message carries indication information, the indication information is used to indicate whether the SN executes a handover procedure.

The intersecting procedure processing device provided in the present application is configured to implement the intersecting procedure processing method provided in the present application, and implementation principle and technical effect of the intersecting procedure processing device are similar to those of the intersecting procedure processing method, and thus are not repeated here.

In some implementations, the intersecting procedure processing device further includes a determining module configured to determine a service processing procedure according to a type of a MN procedure, a type of a secondary node (SN) procedure and a preset priority of procedures, the type of the secondary node procedure is determined by the SN procedure message.

In some implementations, in service scenarios in which at least two procedures of followings are executed, a priority of execution of the procedures from high to low is as follows: a MN handover procedure, a SN handover procedure, a MN non-handover procedure, and a SN non-handover procedure.

In some implementations, the determining module is configured to, in a case where the MN executes the MN handover procedure, and a RRC connection reconfiguration message is not sent to the user equipment, receive the SN modification message carrying the indication information sent by the SN; and encapsulate a MCG of the MN and a SCG of the SN into a new RRC connection reconfiguration message, and send the new RRC connection reconfiguration message to the user equipment.

In some implementations, the determining module is configured to, in a case where the MN executes the MN non-handover procedure, and the RRC connection reconfiguration message is not sent to the user equipment, receive the SN modification message, carrying the indication information, sent by the SN; send the SN modification message carrying the indication information, as the RRC connection reconfiguration message of the SN, to the user equipment; and after receiving a RRC connection reconfiguration completion message sent by the user equipment, process the MN non-handover procedure.

In some implementations, the determining module is configured to, in a case where the MN executes the MN non-handover procedure, the RRC connection reconfiguration message is sent to the user equipment, and the RRC connection reconfiguration completion message fed back by the user equipment is not received, receive the SN modification message carrying the indication information sent by the SN; put the SN modification message carrying the indication information into a cache queue with a highest priority; and after receiving the RRC connection reconfiguration completion message fed back by the user equipment, send the SN modification message carrying the indication information, as the RRC connection reconfiguration message of the SN, to the user equipment.

In some implementations, the determining module is configured to, in a case where the MN executes the MN non-handover procedure, and the RRC connection reconfiguration message is not sent to the user equipment, receive the SN change message sent by the SN; send the SN change message, as the RRC connection reconfiguration message of the SN, to the user equipment; and after receiving the RRC connection reconfiguration completion message fed back by the user equipment, process the MN non-handover procedure.

In some implementations, the determining module is configured to, in a case where the MN executes the MN non-handover procedure, the RRC connection reconfiguration message is sent to the user equipment, and the RRC connection reconfiguration completion message fed back by the user equipment is not received, receive the SN change message sent by the SN; put the SN change message into the cache queue with the highest priority; and after receiving the RRC connection reconfiguration completion message fed back by the user equipment, send the SN change message, as the RRC connection reconfiguration message of the SN, to the user equipment.

Figure 13:
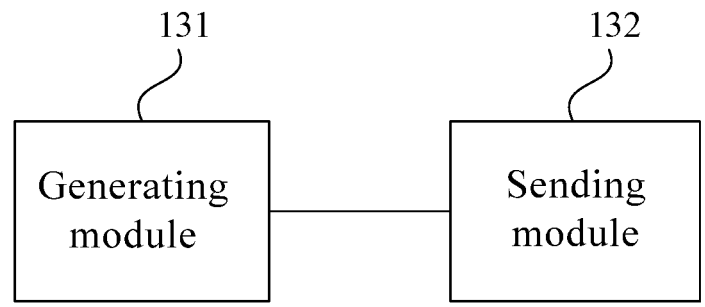
FIG. 13 is a structural schematic diagram of an intersecting procedure processing device according to the present application.

In some implementations, the present application provides an intersecting procedure processing device, FIG. 13 is a structural schematic diagram of an intersecting procedure processing device according to the present application. The device may be suitable for a case that signaling procedures intersect in the dual connectivity architecture. The device may perform the intersecting procedure processing method according to the present application, and the intersecting procedure processing device may be implemented by software and/or hardware and may be integrated on a base station used as the SN.

As shown in FIG. 13, the intersecting procedure processing device according to the present application includes a generating module 131 and a sending module 132.

The generating module 131 is configured to generate a SN procedure message; the SN procedure message includes a SN modification message and a SN change message, the SN modification message carries indication information, the indication information is used to indicate whether the SN executes a handover procedure; and the sending module 132 is configured to send the SN procedure message to a MN.

In some implementations, the intersecting procedure processing device further includes a receiving module configured to receive an air interface configuration information transferred by the MN.

The intersecting procedure processing device provided in the present application is configured to implement the intersecting procedure processing method provided in the present application, and implementation principle and technical effect of the intersecting procedure processing device are similar to those of the intersecting procedure processing method, and thus are not repeated here.

Figure 14:
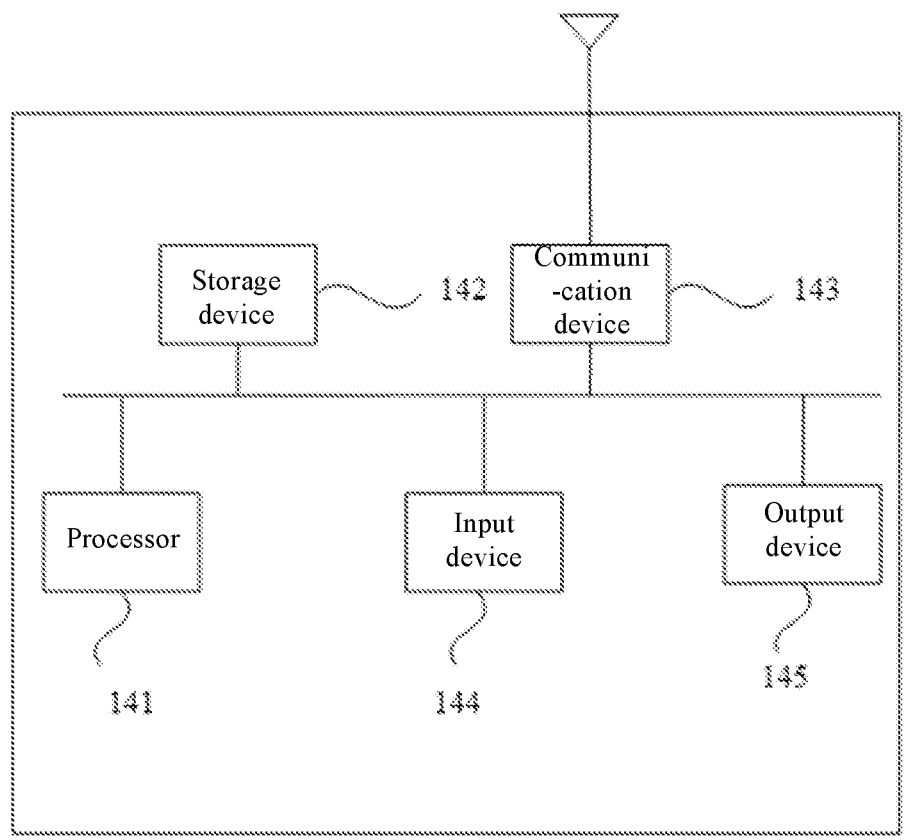
FIG. 14 is a structural schematic diagram of a base station according to the present application.

The present application provides a base station, FIG. 14 is a structural schematic diagram of a base station according to the present application, and as shown in FIG. 14, the base station includes one or more processors 141 and a storage device 142; one processor 141 is illustrated in FIG. 14 as an example; the storage device 142 is used to store one or more programs; the one or more programs, when executed by the one or more processors 141, causes the one or more processors 141 to implement the intersecting procedure processing method described in the present application.

The base station further includes a communication device 143, an input device 144, and an output device 145.

The processor 141, the storage device 142, the communication device 143, the input device 144, and the output device 145 in the base station may be connected by a bus or other ways, and FIG. 14 illustrates a connection of a bus as an example.

The input device 144 may be used to receive entered numeric or character information and generate key signal inputs relating to user configurations and function controls of the base station. The output device 145 may include a display device such as a display screen and the like.

The communication device 143 may include a receiver and a transmitter. The communication device 143 is configured to perform information transceiving communication according to control of the processor 141.

The storage device 142, as a computer-readable storage medium, may be configured to store software programs, computer-executable programs and modules, such as program instructions/modules corresponding to the intersecting procedure processing method described in the present application (e.g., the receiving module 121 in the intersecting procedure processing device, or the generating module 131 and the sending module 132 in the intersecting procedure processing device). The storage device 142 may include a storage program area and a storage data area, the storage program area may store an operating system, an application program for at least one function; and the storage data area may store data created according to use of the device, and the like. The storage device 142 may include a high-speed random access memory, or a non-volatile memory, such as one or more magnetic storage devices, flash memories, or other non-volatile solid-state memories. In some implementations, the storage device 142 may further include memories configured remotely with respect to the processor 141, and these remote memories may be connected to the device via a network. The examples of the network described above include, but are not limited to, the internet, intranets, local area networks, mobile communication networks, and combinations of these networks.

The present application further provides a storage medium including a computer program, the computer program, when executed by a processor, implements the intersecting procedure processing method described in the present application.

When the intersecting procedure processing method described in the present application is implemented, the method includes: receiving a SN procedure message sent by the SN; the SN procedure message includes a SN modification message and a SN change message, the SN modification message carries indication information, the indication information is used to indicate whether the SN executes a handover procedure.

When the intersecting procedure processing method described in the present application is implemented, the method includes: generating a SN procedure message; the SN procedure message includes a SN modification message and a SN change message, the SN modification message carries indication information, the indication information is used to indicate whether the SN executes a handover procedure; and sending the SN procedure message to a MN.

The above description is only for illustrating exemplary implementations of the present application, and is not intended to limit the scope of the present application.

It should be understood by those skilled in the art, the term "user equipment" encompasses any suitable type of wireless user equipment, such as mobile telephones, portable data processing devices, portable web browsers or vehicle mounted mobile stations.

The present application may be implemented in hardware or special purpose circuits, software, logic or any combination thereof. For example, some aspects may be implemented in hardware, while other aspects may be implemented in firmware or software which may be executed by a controller, a microprocessor or other computing devices, although the present application is not limited thereto.

The present application may be implemented by a data processor of a mobile device executing computer program instructions, for example in a processor entity, or by hardware, or by a combination of software and hardware. The computer program instructions may be assembler instructions, instruction set architecture (ISA) instructions, machine instructions, machine-related instructions, microcode, firmware instructions, state setting data, or source or object code written in any combination of one or more programming languages.

The block diagram of any logical flowchart in the accompanying drawings of the present application may represent program operations; or may represent interconnected logic circuits, modules, and functions; or may represent a combination of program operations and logic circuits, modules, and functions. A computer program may be stored in the storage device. The storage device may be of any type suitable for the local technical environment and may be implemented by using any suitable data storage technology, such as, but is not limited to, a Random Access Memory (RAM), a Read-Only Memory (ROM), an optical storage device and system (a digital video disc (DVD) or a compact disc (CD)) and the like. The computer-readable medium may include a non-transitory storage medium. The data processor may be of any type suitable for the local technical environment, such as, but is not limited to, a general computer, a specific computer, a microprocessor, a digital signal processor (DSP), an application specific integrated circuit (ASIC), a field programmable gate array (FPGA), and a processor based on a multi-core processor architecture.

What is claimed is:

1. An intersecting procedure processing method for processing at least two procedures occurring simultaneously, applied to a master node, comprising:
   receiving a secondary node procedure message sent by a secondary node; the secondary node procedure message comprises a secondary node modification message and a secondary node change message, the secondary node modification message carries indication information, the indication information is configured to indicate whether the secondary node executes a handover procedure,
   the method further comprises:
   determining a service processing procedure according to a type of a master node procedure, a type of a secondary node procedure and a preset priority of procedures, wherein the type of the secondary node procedure is determined by the secondary node procedure message,
   wherein in service scenarios in which at least two procedures of followings are executed, a priority of execution of the procedures from high to low is as follows:
   a master node handover procedure, a secondary node handover procedure, a master node non-handover procedure, and a secondary node non-handover procedure.

2. The method of claim 1, wherein the determining a service processing procedure according to a type of a master node procedure, a type of a secondary node procedure and a preset priority of procedures comprises:
   in response to that the master node executes the master node handover procedure, and a radio resource control (RRC) connection reconfiguration message is not sent to user equipment, receiving the secondary node modification message carrying the indication information sent by the secondary node; and
   encapsulating a master cell group (MCG) of the master node and a secondary cell group (SCG) of the secondary node into a new RRC connection reconfiguration message, and sending the new RRC connection reconfiguration message to the user equipment.

3. The method of claim 1, wherein the determining a service processing procedure according to a type of a master node procedure, a type of a secondary node procedure and a preset priority of procedures comprises:
   in response to that the master node executes the master node non-handover procedure, and the RRC connection reconfiguration message is not sent to user equipment, receiving the secondary node modification message carrying the indication information sent by the secondary node;
   sending the secondary node modification message carrying the indication information, as the RRC connection reconfiguration message of the secondary node, to the user equipment; and
   after receiving a RRC connection reconfiguration completion message sent by the user equipment, processing the master node non-handover procedure.

4. The method of claim 1, wherein the determining a service processing procedure according to a type of a master node procedure, a type of a secondary node procedure and a preset priority of procedures comprises:
   in response to that the master node executes the master node non-handover procedure, the RRC connection reconfiguration message is sent to user equipment, and the RRC connection reconfiguration completion message fed back by the user equipment is not received, receiving the secondary node modification message carrying the indication information sent by the secondary node;
   putting the secondary node modification message carrying the indication information into a cache queue with a highest priority; and
   after receiving the RRC connection reconfiguration completion message fed back by the user equipment, sending the secondary node modification message carrying the indication information, as the RRC connection reconfiguration message of the secondary node, to the user equipment.

5. The method of claim 1, wherein the determining a service processing procedure according to a type of a master node procedure, a type of a secondary node procedure and a preset priority of procedures comprises:
   in response to that the master node executes the master node non-handover procedure, and the RRC connection reconfiguration message is not sent to user equipment, receiving the secondary node change message sent by the secondary node;
   sending the secondary node change message, as the RRC connection reconfiguration message of the secondary node, to the user equipment; and after receiving the RRC connection reconfiguration completion message fed back by the user equipment, processing the master node non-handover procedure.

6. The method of claim 1, wherein the determining a service processing procedure according to a type of a master node procedure, a type of a secondary node procedure and a preset priority of procedures comprises:

in response to that the master node executes the master node non-handover procedure, the RRC connection reconfiguration message is sent to user equipment, and the RRC connection reconfiguration completion message fed back by the user equipment is not received, receiving the secondary node change message sent by the secondary node;

putting the secondary node change message into a cache queue with a highest priority; and after receiving the RRC connection reconfiguration completion message fed back by the user equipment, sending the secondary node change message, as the RRC connection reconfiguration message of the secondary node, to the user equipment.

7. An intersecting procedure processing method for processing at least two procedures occurring simultaneously, applied to a secondary node, comprising:

generating a secondary node procedure message; the secondary node procedure message comprises a secondary node modification message and a secondary node change message, the secondary node modification message carries indication information, the indication information is configured to indicate whether the secondary node executes a handover procedure; and sending the secondary node procedure message to a master node, so that the MN determines a service processing procedure according to a type of a master node procedure, a type of a secondary node procedure and a preset priority of procedures, wherein the type of the secondary node procedure is determined by the secondary node procedure message, wherein in service scenarios in which at least two procedures of followings are executed, a priority of execution of the procedures from high to low is as follows:

a master node handover procedure, a secondary node handover procedure, a master node non-handover procedure, and a secondary node non-handover procedure.

8. An intersecting procedure processing device for processing at least two procedures occurring simultaneously, configured in a master node, comprising:

a receiving module configured to receive a secondary node procedure message sent by a secondary node; the secondary node procedure message comprises a secondary node modification message and a secondary node change message, the secondary node modification message carries indication information, the indication information is configured to indicate whether the secondary node executes a handover procedure, wherein the receiving module is further configured to determine a service processing procedure according to a type of a master node procedure, a type of a secondary node procedure and a preset priority of procedures, wherein the type of the secondary node procedure is determined by the secondary node procedure message, wherein in service scenarios in which at least two procedures of followings are executed, a priority of execution of the procedures from high to low is as follows:

a master node handover procedure, a secondary node handover procedure, a master node non-handover procedure, and a secondary node non-handover procedure.

9. A base station, comprising:

at least one processor; and a storage device configured to store at least one program;

the at least one program, when executed by the at least one processor, causes the at least one processor to implement the method of claim 1.

10. A non-transitory storage medium having a computer program stored therein, the computer program, when executed by a processor, implements the method of claim 1.

* * * * *